United States Patent [19]
Breeden

[11] Patent Number: 5,459,774
[45] Date of Patent: Oct. 17, 1995

[54] DIALING PREFIX METHOD AND APPARATUS

[75] Inventor: Robert L. Breeden, Boynton Beach, Fla.

[73] Assignee: Motorola, Inc., Schaumburg, Ill.

[21] Appl. No.: 197,108

[22] Filed: Feb. 16, 1994

Related U.S. Application Data

[63] Continuation of Ser. No. 68,596, May 28, 1993, abandoned, which is a continuation of Ser. No. 569,498, Aug. 20, 1990, which is a continuation of Ser. No. 524,621, May 17, 1990.

[51] Int. Cl.$^6$ ....................................... H04Q 7/32
[52] U.S. Cl. ............................ 379/58; 379/354; 379/396
[58] Field of Search ................................ 379/56, 58–60, 379/61, 63, 354–357, 396

[56] References Cited

U.S. PATENT DOCUMENTS

| | | | |
|---|---|---|---|
| 4,682,357 | 7/1987 | Irino | 379/356 |
| 4,707,854 | 11/1987 | Mayer | 379/355 |
| 4,800,582 | 1/1989 | D'Agosto, III et al. | 379/354 |
| 4,850,009 | 7/1989 | Zook et al. | 379/56 |
| 4,868,862 | 9/1989 | Ryoichi et al. | 379/58 |
| 4,980,910 | 12/1990 | Oba et al. | 379/355 |

FOREIGN PATENT DOCUMENTS

| | | | |
|---|---|---|---|
| 0212761 | 3/1987 | European Pat. Off. | 379/61 |
| 3329267 | 2/1985 | Germany | 379/58 |
| 0085459 | 3/1989 | Japan | 379/355 |

OTHER PUBLICATIONS

Use & Care Guide, G.E. 32 Number Speaker Telephone, 87–46 date code (year-week). See pp. 13–14.

*Primary Examiner*—Curtis Kuntz
*Assistant Examiner*—Dwayne D. Bost
*Attorney, Agent, or Firm*—R. Louis Breeden; Gregg Rasor

[57] ABSTRACT

In a radio telephone (100, 200) having a keypad (206) for receiving first information (302), a memory (112) for storing second information (313), and an intelligent editing function. There is provided a method of transmitting information representing a phone number using the intelligent editing function that selects a prefix mode when a phone number has been automatically entered and selects an appending edit mode when the information representing a phone number has been manually entered. The information is then edited to form a complete phone number (315), and transmitted (102, 104, 105, 106).

14 Claims, 7 Drawing Sheets

DIALING PREFIX METHOD AND APPARATUS

This is a continuation of application Ser. No. 068,596, filed May 28, 1993 and now abandoned, which was a continuation of application Ser. No. 569,498, filed Aug. 20, 1990 and now abandoned, which is a continuation of application Ser. No. 524,621, filed May 17, 1990 and now abandoned in part.

1. Field of the Invention

This invention relates in general to telephone communication systems, and more particularly to the appending and editing of a stored access number to a manually entered prefix number for accessing a public switched telephone network (PSTN).

2. Background of the Invention

In contemporary telephone systems, the telephone user addresses other radio telephone units or land-line telephones by entering a telephone number that corresponds to the phone system address of the user to be contacted. Once the connection is complete, two way voice or data communications can take place.

With the widespread use of of cellular telephone systems in automobiles and other transportation means as a mode of communication, there have been a number of accidents or near accidents caused by cellular telephone users that have had to look at their set for an extended period of time while dialing a phone number. In order to make the task of dialing an access number easier, manufacturers added a memory feature to their telephones. This memory feature enables a user to recall pre-programmed numbers for automatic dialing. The present memory dialing method works fine when the user is in the geographic region covered by his or her primary service carrier. However, when the user is "roaming," that is, the user leaves the area in which the user's primary carrier is operating, the user is sometimes required to prefix the stored numbers with an additional access code. With typical PSTN (public switched telephone network) access numbers being seven digits in length and area codes being three digits, cellular telephone users generally program their unit's memory with a seven or ten digit number. When additional digits, such as a system access code are needed, the user must either enter the entire number manually or by storing multiple numbers, thus wasting valuable memory slots. As can be appreciated, none but the most talented users can safely enter a long phone number while driving in rush hour traffic without risking an accident.

Some cordless telephones, particularly those conforming to the Pan-European CT-2 specification, are capable of receiving a selective call numeric message representing a phone number where the message originator can be reached. This can be used to create a "pseudo" inbound calling capability by utilizing the received number presented in the message to originate a return call when the user reaches a Telepoint. Upon receiving the page, the user would see the call-back number, travel into range of a call-point, then activate a transmitter to originate a call to the number specified by the displayed message. However, this simple scenario does not address the requirements of modifying the received number to include toll, area, or other access codes. Regrettably, the only method available in a contemporary cordless telephone technology to modify a number is to delete the current last digit (at the cursor pointer) or complete telephone number.

SUMMARY OF THE INVENTION

In carrying out the above, there is provided a method of transmitting information representing a phone number comprising the steps of receiving first information from a keypad representing at least one digit of the phone number, appending second information representing additional digits stored in a memory to the first information, and transmitting the first and second information.

This method is implemented in a radio telephone comprising a keypad for entering first information representing at least one digit of a phone number, a memory for storing second information representing additional digits of the phone number, means for appending the first information to the second information to form a complete phone number, and means for transmitting the complete phone number.

DESCRIPTION OF A PREFERRED EMBODIMENT

Figure 1:
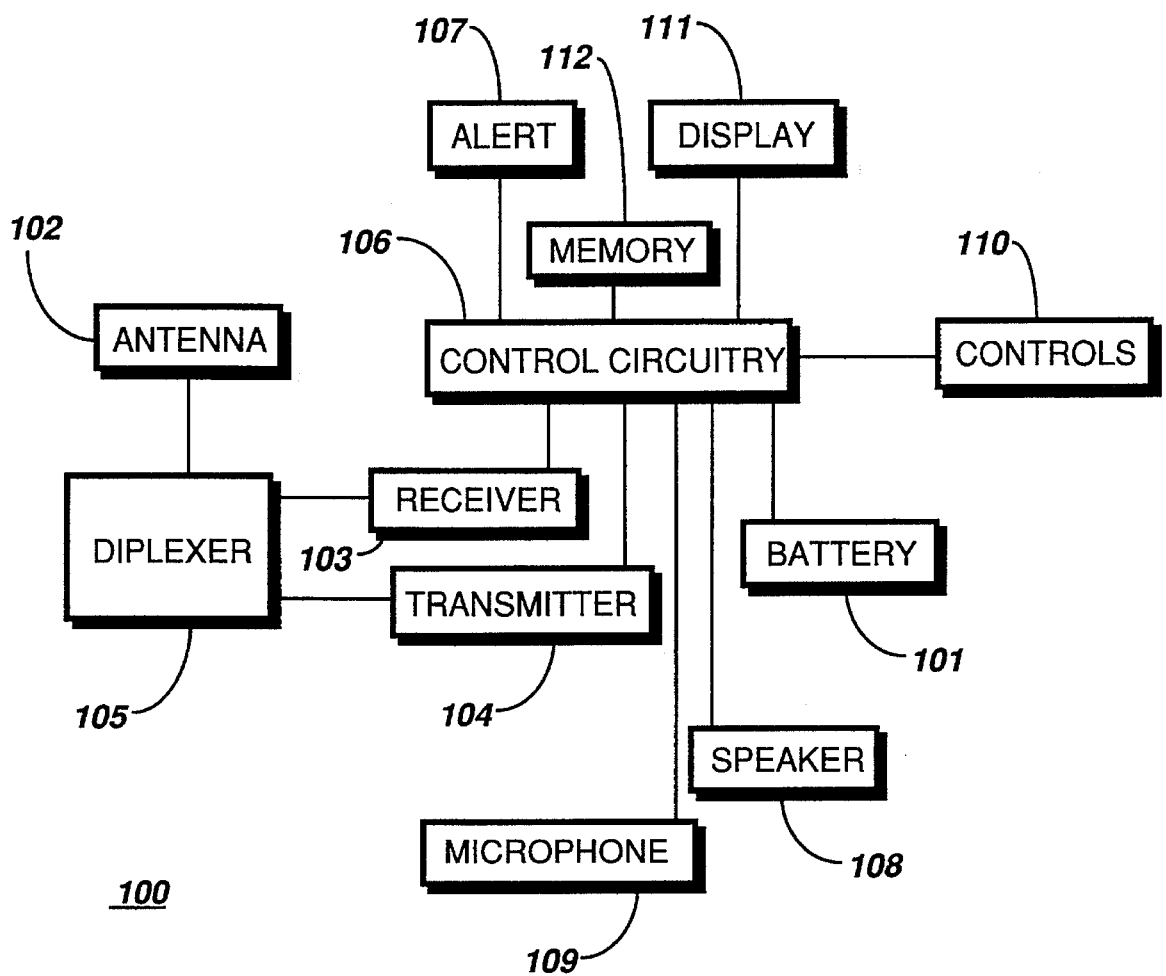
FIG. 1 is a block diagram of the radio telephone.

Referring to FIG. 1, a block diagram is shown of the battery (energy source) 101 powered radio telephone 100. A radio frequency signal is received or transmitted by the antenna 102. The antenna is coupled to the receiver 103 and transmitter 104 by a diplexer 105. The received signal is routed from the receiver 103 to the control circuitry 106 that recovers any information represented by the received signal. The recovered information is then used to activate functions within the radio telephone 100 such as the alert 107 (a ringer in the case of a radio telephone), and after answering the call, sustain the connection. When a connection is established, the user aurally communicates with the other party via the speaker 108 and a microphone 109. Recovered audio from the control circuitry 106 is routed to the speaker 108 which converts electrical energy into acoustical energy thus enabling the user to hear any communications. The microphone 109 is used to convert acoustic energy into electrical energy for use by the control circuitry 106 in modulating the radio frequency carrier produced by the transmitter 104. The user may initiate a call by selecting on a keypad 205 the proper controls 110 representing the number of a party to be contacted. In this embodiment, the user may enter first information representing an access code (or prefix) such as those needed by long distance PSTN carriers to access their system, then recall a local number containing second information from one of a plurality of memory locations available within the control circuitry 106. The recall of the second information from the memory 112 associated with the control circuitry 106 is accomplished by entering third information that is processed by the control circuitry 106. The control circuitry 106 then reads a stored number from the memory 112 and forms a complete number.

The formation of the complete number is accomplished by appending the alternate access code to the number recalled from the memory 112. Before dialing, the complete number is presented on a display 111 which provides visual feedback for the user. If desired, the user may either place the call, edit the number, or abort the dialing operation. When a call is initiated, the transmitting means 106, 104, 105, 102, broadcasts a modulated radio frequency carrier having information representative of the PSTN access codes, both alternate (limited or controlled access) and standard (local). The radio telephone base or an alternate unit then establishes a communication link once the proper identification is confirmed.

Figure 2:
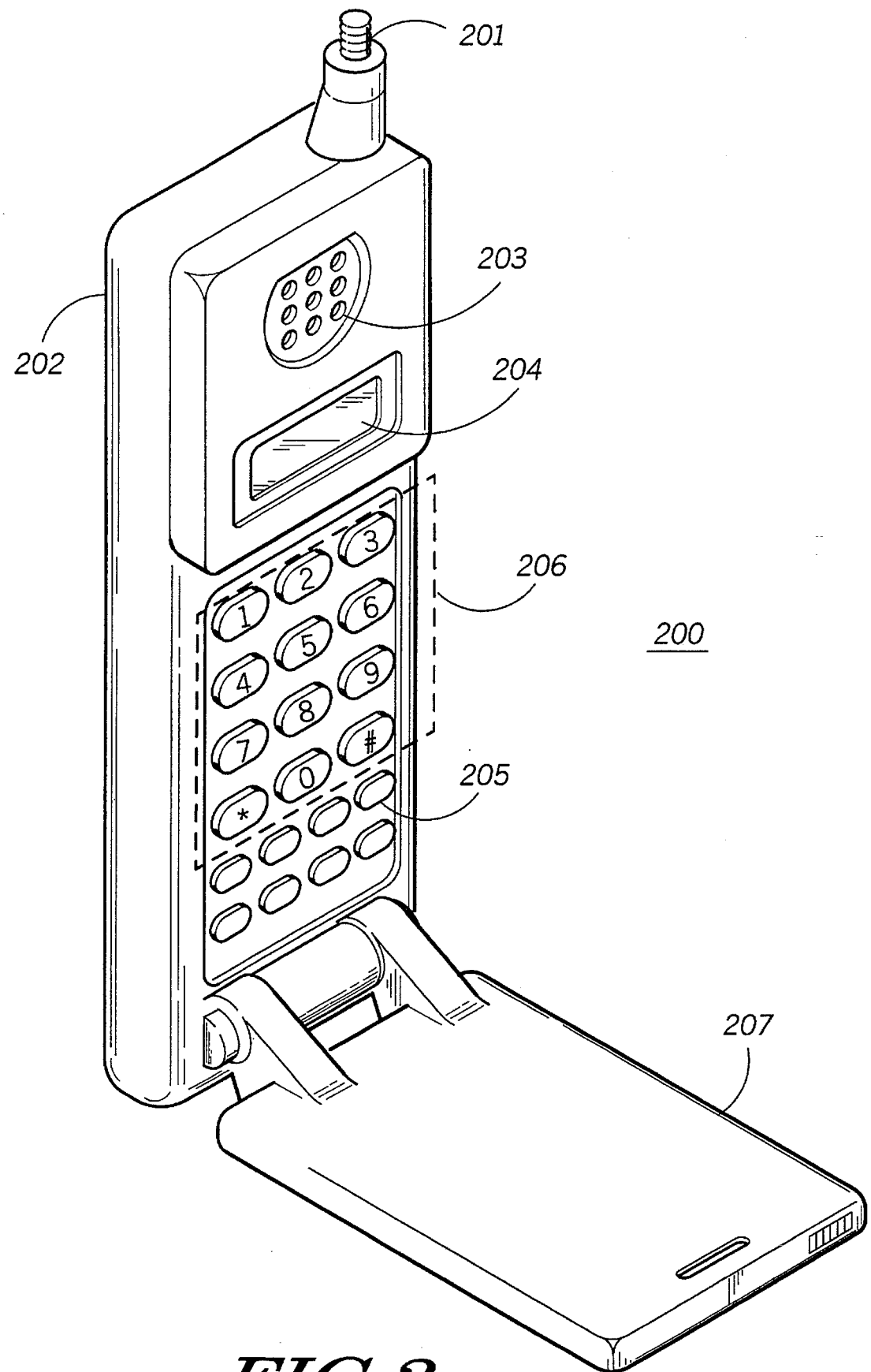
FIG. 2 is an front isometric view of the radio telephone.

Referring to FIG. 2, the front isometric view of the radio telephone 200 shows the antenna 201, radio telephone housing 202, loudspeaker 203, display 204, control pad including a dialing keypad 206 and associated operational controls 205 such as a clear key, function key, recall key, and a microphone 207. Electrical contacts (not shown) located on the back of the radio telephone 200 are provided for charging the removable power source in the radio telephone. For example, charging is accomplished by folding the lower articulated portion upward against the control pad 205 then inserting the folded unit into a charging apparatus (not shown). Alternatively, a portable power adapter can be coupled into a power jack located on the radio telephone 200 for charging the power source or supplying external power.

Figure 3:
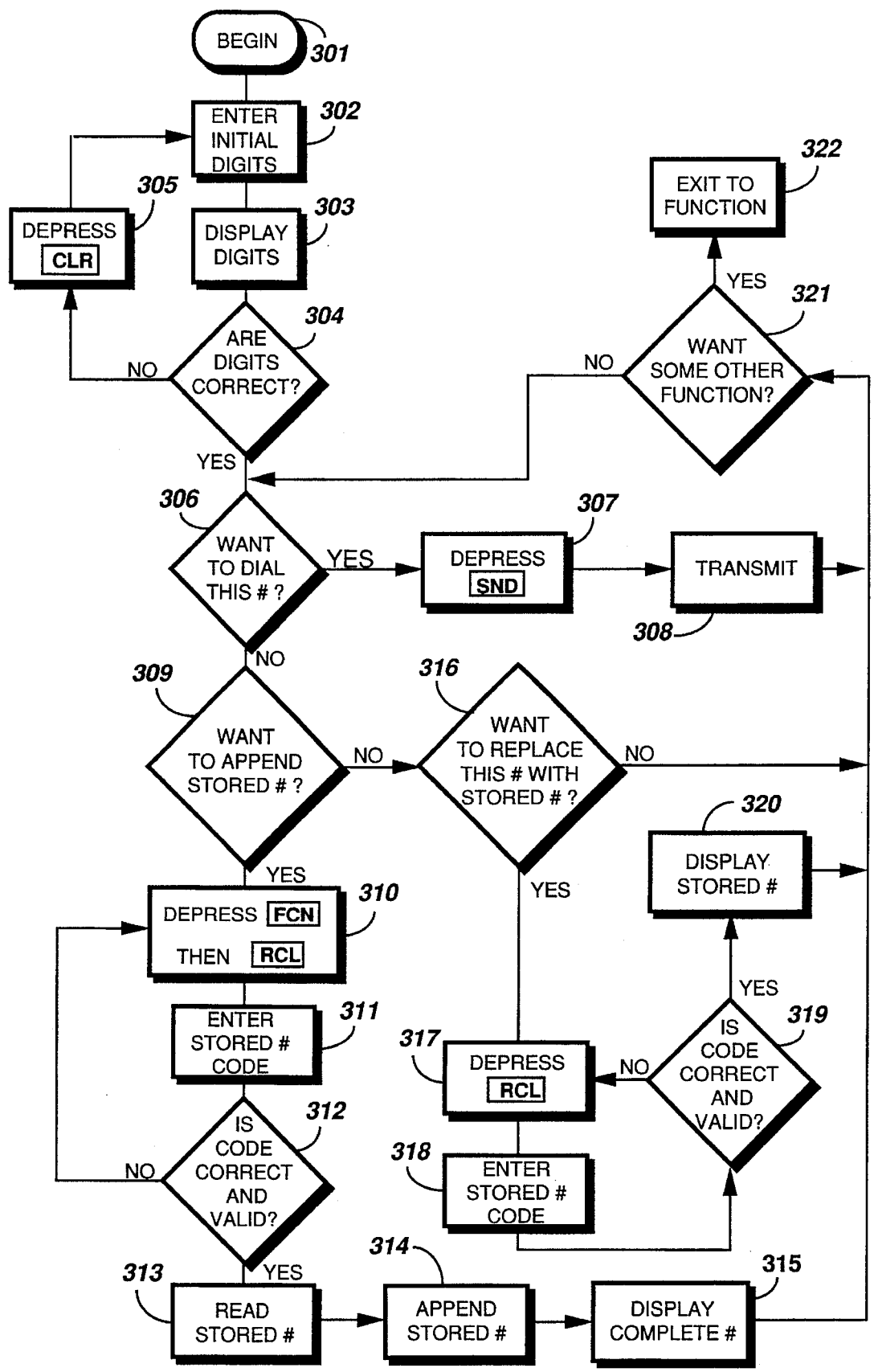
FIG. 3 is a flow diagram of the method for entering a prefix code and recalling a stored telephone number.

Referring to FIG. 3, when the user invokes the call mode 301 on the radio telephone 200, the controller circuitry 106 scans the controls 110. The user may abort the call mode at any time by entering an "escape" keystroke or waiting for the entry mode to "time out." When the user enters initial digits 302, the controller processes this first information for acceptance as valid digits and displays 303 the digits. When a valid access code or number has been entered, it is presented 303, thus providing feedback and allowing the user to accept or reject the code entered 304. If the digits entered are incorrect the user may press the CLR (clear) function key 305 clearing the present entry and returning to step 302 to enter new digits. If the digits displayed in step 303 are correct, the user may choose to dial the number 306 by depressing the SND (send) function key which initiates transmission 308 of the call information. The user may optionally append a stored number 309 to the number displayed in step 303 or replace the displayed number with another stored number 316 by activating the RCL (recall) function key 317, entering the stored number's code or memory number 318, determining if the code is correct and valid 319, and displaying the newly recalled stored number 320. If the user wants to append a stored number to the number displayed in step 303, the user would, for example, activate the FCN (function) then the RCL (recall) keys in sequence 310, enter a stored number code 311. If the memory recall entry number is tested for validity in step 312 and if valid the stored number code 311 representing second information is read from memory 313 and sequentially assembled into a complete phone number by appending the second information to the first information. The complete number to be dialed is then presented 315 on a display to the user for verification 306. The user can then accept or reject the transmission 308 of the complete number. If the user rejects transmission or after dialing has been completed, the call initiation sequence returns control to normal standby radio telephone functions 322.

When the user is ready to transmit the number (initiate a call), step 321 tests for the activation of any other radio function. If no other function has been selected and the user wants to dial the number displayed 306, the SND (send) function is selected 307 and transmission 308 of the of the call information takes place. After transmission control returns to step 321 awaiting another function 322 or subsequent transmissions.

Figure 4:
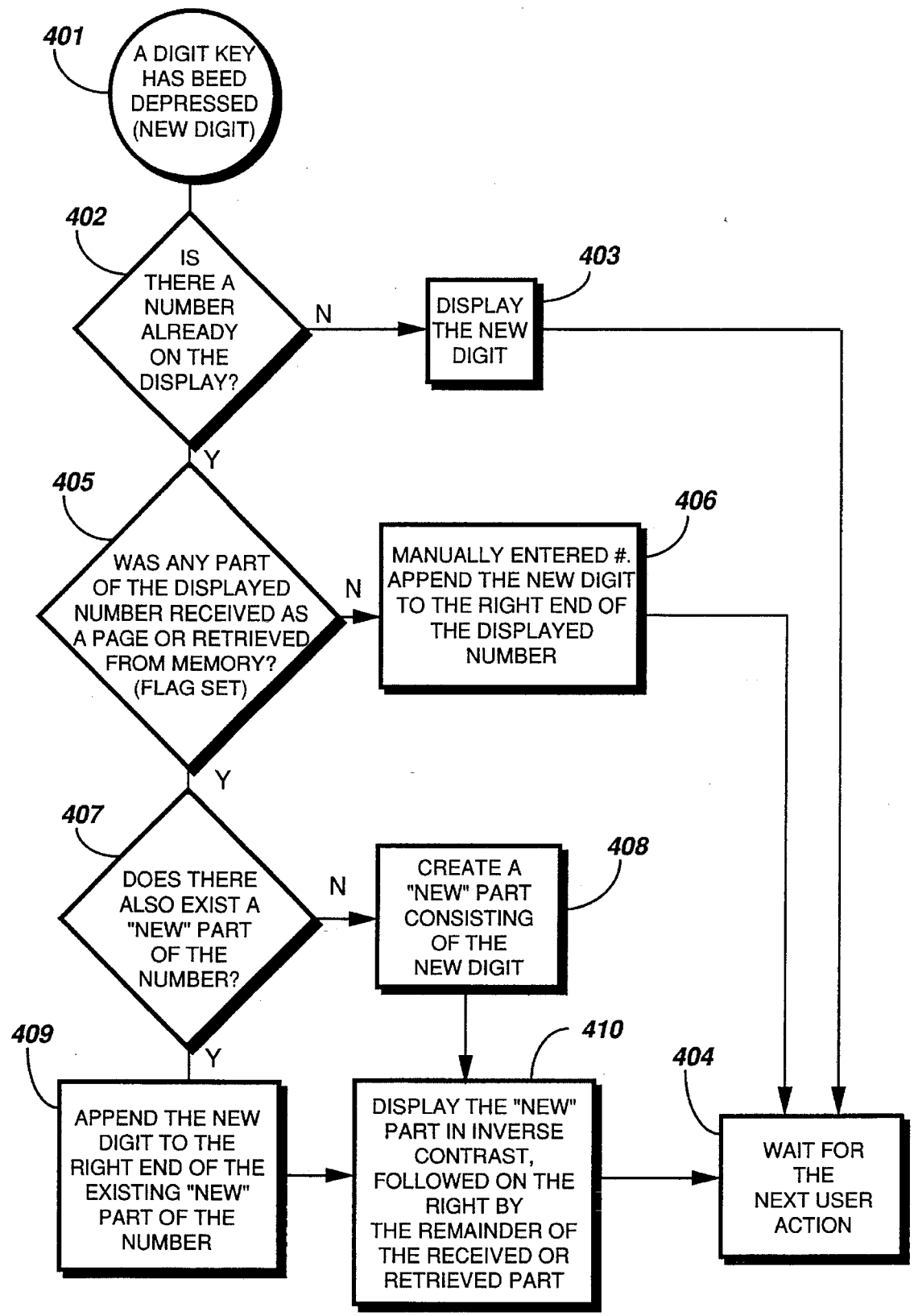
FIG. 4 is a flow diagram of a method for editing a displayed telephone number using the digit keys in accordance with the present invention.

Referring to FIG. 4, the flow diagram illustrates the operation of an intelligent editing function using the digit keys that allows the user to either append and correct digits to a manually entered number or prefix and delete digits from a received or recalled (automatically entered) number. The decision as to the placement of the editing cursor and its function (append or delete) is determined by the origin of the displayed number. Upon sensing the entry of a digit (step 401 ), control is passed to decision 402. If the number is manually entered (i.e. the display has been previously cleared), decision 402 falls, a new digit is displayed (403), and control is passed to step 404, which waits for the next user action. If no number is displayed in decision 402, decision 405 tests for the origination mode of any part of the displayed number. In the case where the number has been completely entered in a manual mode, decision 405 falls and passes control to step 406, which appends the new digit to the right end of the displayed number. After the display operation in step 406 is complete control is passed to step 404 that waits for the next user action. If the number tested in decision 405 contained any digits that where either recalled from memory or received in a selective call message, control is passed to decision 407 which checks for a "new" part of the number. If there is no new part of the number, decision 407 fails and step 408 creates a new part consisting of the new digit entered in step 401. If there is a new part in decision 407, step 409 appends a new digit to the rightmost end of the existing "new" part of the displayed number. In both cases of adding a new digit, step 410 displays the new digit in inverse contrast followed by the remainder of the received or retrieved portion of the number. Step 410 the passes control to step 404 to wait for the next user action.

Figure 5:
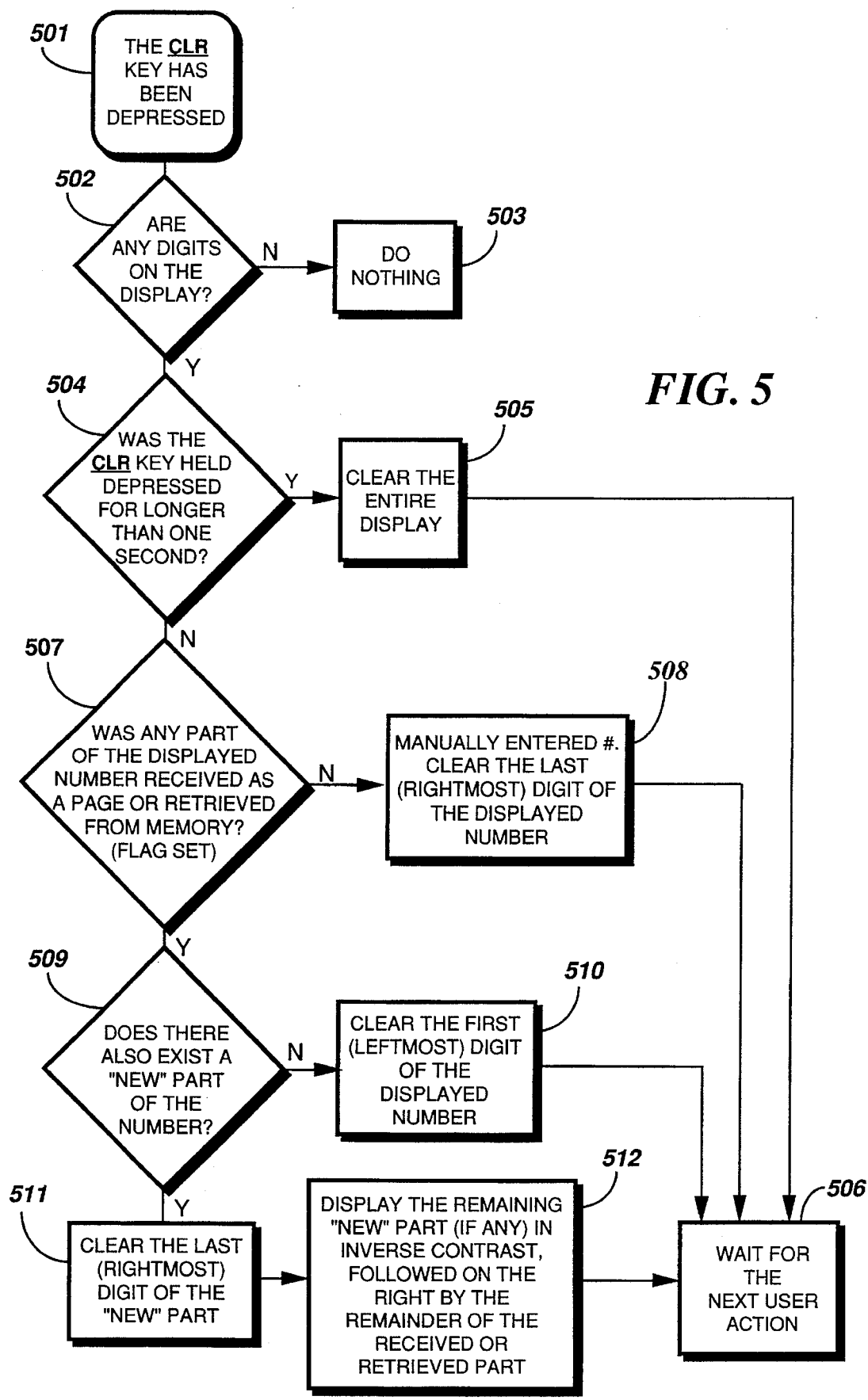
FIG. 5 is a flow diagram of a method for editing a displayed telephone number using the CLR key in accordance with the present invention.

Referring to FIG. 5, the flow diagram illustrates the operation of an intelligent editing function using the clear key that allows the user to either append and correct digits to a manually entered number or prefix and delete digits from a received or recalled (automatically entered) number. Upon sensing the activation of the CLR key (step 501), control is passed to decision 502. If there are no digits on the display, the activation is ignored (step 503). If digits are present on the display, decision 502 is true and control is passed to step 504, which tests for the activation of the CLR key for more than one second. If the CLR key is activated for more than one second, decision 504 is true, the display is cleared (step 505), and control is passed to step 506 that waits for the next user action. If decision 504 fails, decision 507 tests for any part of the displayed number having been recalled from memory or received as a message. If decision 507 fails, the most recent manually entered digit (rightmost) of the displayed number is cleared and control is passed to step 506 to wait for the next user action. When decision 507 is true, decision step 509 test for a "new" part of the number is discussed in reference to FIG. 4. If there is no "new" part (decision 509 fails), step 510 clears the first (leftmost) digit of the displayed number and control is passed to step 506 to wait for the next user action. When decision 509 is true, step 511 clears the last (rightmost) digit of the "new" part, step 512 displays the remaining "new" part in inverse contrast followed on the fight by the remainder of the received or recalled portion of the telephone number, and step 506 waits for the next user action.

Figure 6:
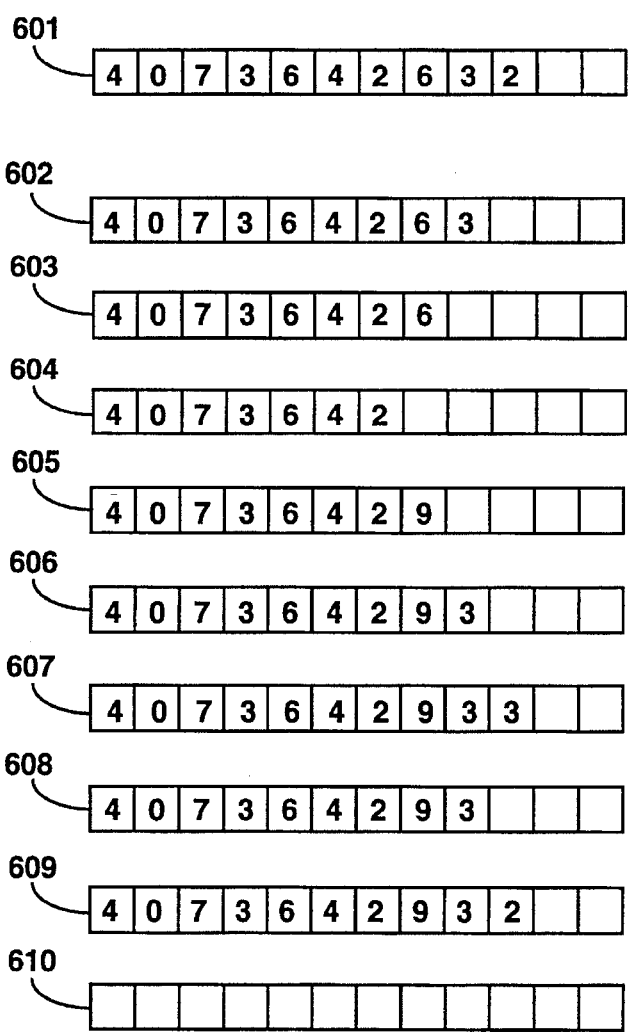
FIG. 6 illustrates conventional clear and digit key editing of a manually entered telephone number.

Referring to FIG. 6, the sequence (601–610) a conventional clear and digit key editing of a manually entered telephone number. In this example, the user desires to change a manually entered telephone number of "4073642632" to "4073642932." The display (601) preferably comprises a twelve digit presentation device showing the manually entered telephone number "4073642632." When the user activates a CLR key (602, 603, 604), the last digit at each respective activation "2", "3", and "6" is erased. The user then may activate the "9", "3", and "3" keys (605, 606, 607) causing the display to append the digits "933" to the number "4073642" resulting in the number "4073642933" (607). In this example, the "3" key was accidentally activated one to many times resulting in the number "4073642933" (607). To correct the last digit, the user again activates the CLR key (608) clearing the last "3," then the "2" key appending a new "2" to result in the number "4073642932" (609) being displayed. If the user desires to clear the complete number, the CLR key must be activated and held for more than one second resulting in the display being cleared (610).

Figure 7:
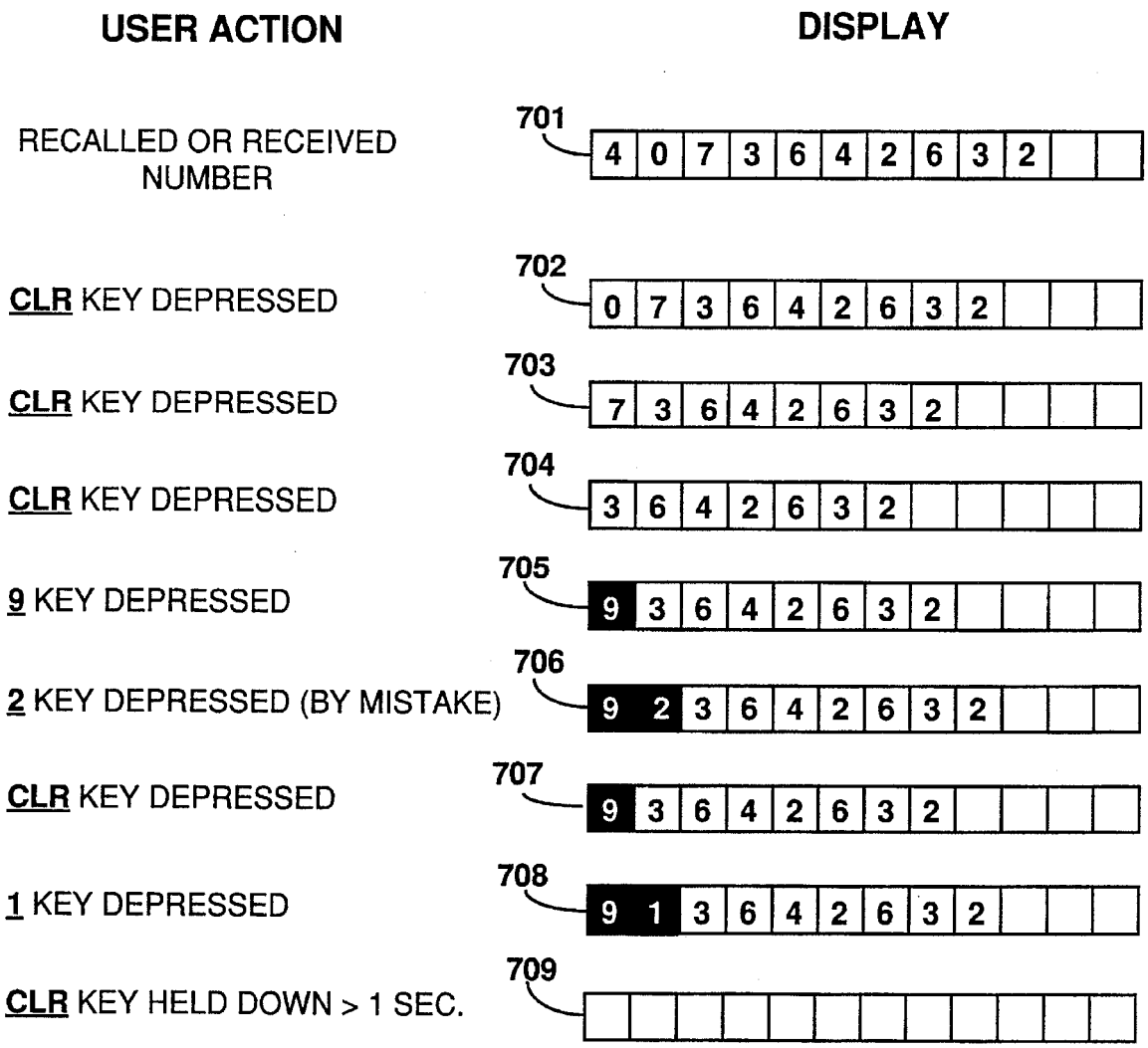
FIG. 7 illustrates clear and digit key editing of a received or recalled telephone number performed in accordance with the present invention.

Referring to FIG. 7, the sequence (701–709) illustrates the preferred clear and digit key editing of an automatically entered telephone number. In this example, assume that the user desires to change a received or retrieved telephone number of "4073642632" to "913642632." The display (701) preferably comprises a twelve digit presentation device displaying the automatically entered telephone number "4073642632." When the user activates the CLR key (702, 703, 704), the first digit at each respective activation "4", "0", and "7", is deleted. The user then activates the "9" and "2" keys (705, 706) causing the display to insert the digits "92" in front (to the left) of the number "3462632" resulting in the number "923642632" (706). In this example, the "2" key was accidentally activated resulting in the number "923642632" (706). To correct the last entered digit, the user again activates the CLR key (707) deleting the last "2", then the "1" key prefixing a new "1" after the "9" and resulting in the number "913462632" (708) being displayed. If the user desires to clear the complete number, the CLR key must be activated and held for more than one second resulting in the display being cleared (709).

I claim:

1. A method of editing and transmitting information displayed on a display, the information representing a telephone number, the method comprising the steps of:

entering, by a user, a new digit for display on the display;

testing, before displaying the new digit, whether there is a number currently displayed on the display;

determining, in response to a positive result from the testing step, whether at least a first portion of the number is a stored number retrieved from a memory;

evaluating, in response to a positive result from the determining step, whether there exists a second portion of the number, the second portion comprising at least one newly added digit placed immediately in front of the first portion;

creating the second portion in response to a negative result from the evaluating step, wherein the second portion consists of the new digit;

inserting the new digit between the first and second portions in response to a positive result from the evaluating step;

displaying the information, as edited, on the display;

repeating the testing, determining, evaluating, creating, inserting, and displaying steps in response to each additional new digit entered by the user; and transmitting the information, as edited, in response to a user command to transmit the information displayed on the display.

2. The method of claim 1, further comprising the step of displaying the new digit in response to a negative result from the testing step.

3. The method of claim 1, wherein the number has a right end, and wherein the method further comprises the step of appending the new digit to the right end of the number in response to a negative result from the determining step.

4. The method of claim 1, wherein, in response to both the first and second portions being present on the display, the displaying step displays the first and second portions in a manner that distinguishes the first portion from the second portion.

5. A method of editing and transmitting information displayed on a display, the information representing a telephone number, the method comprising the steps of:

entering, by a user, a first user command to clear a displayed digit;

testing, in response, whether there is a number on the display, wherein the number comprises a rightmost digit;

determining, in response to a positive result from the testing step, whether at least a first portion of the number is a stored number retrieved from a memory, wherein the first portion comprises a first digit;

evaluating, in response to a positive result from the determining step, whether there exists a second portion of the number, the second portion comprising at least one newly added digit placed immediately in front of the first portion, wherein the second portion comprises a last digit;

clearing the first digit of the first portion in response to a negative result from the evaluating step;

clearing the last digit of the second portion in response to a positive result from the evaluating step;

displaying the information, as edited, on the display;

repeating the testing, determining, evaluating, clearing, and displaying steps in response to each additional first user command entered to clear an additional displayed digit; and transmitting the information, as edited, in response to a second user command to transmit the information displayed on the display.

6. The method of claim 5, further comprising the step of clearing the rightmost digit of the number in response to a negative result from the determining step.

7. The method of claim 5, wherein, in response to both the first and second portions being present on the display, the displaying step displays the first and second portions in a manner that distinguishes the first portion from the second portion.

8. A radio telephone comprising means for editing and transmitting information displayed on a display, the information representing a telephone number, the radio telephone comprising:

a receiver for correlating a selective call address associated with the radio telephone and, upon correlating the selective call address with the radio telephone, providing a received message;

control circuitry coupled to the receiver for controlling the radio telephone;

a memory coupled to the control circuitry for recording a stored number;

the display coupled to the control circuitry for displaying the stored number and other information;

controls coupled to the control circuitry for providing user control of the radio telephone and for entry, by a user, of a new digit for display on the display;

a transmitter coupled to the control circuitry for transmitting messages from the radio telephone;

means within the control circuitry for testing, before displaying the new digit, whether there is a number currently displayed on the display;

means within the control circuitry for determining, in response to a positive result from the means for testing, whether at least a first portion of the number is the stored number retrieved from the memory;

means within the control circuitry for evaluating, in response to a positive result from the means for determining, whether there exists a second portion of the number, the second portion comprising at least one newly added digit placed immediately in front of the first portion;

means within the control circuitry for creating the second portion in response to a negative result from the means for evaluating, wherein the second portion consists of the new digit;

means within the control circuitry for inserting the new digit between the first and second portions in response to a positive result from the means for evaluating;

means within the control circuitry for displaying the information, as edited, on the display;

means within the control circuitry for repeating the testing, determining, evaluating, creating, inserting, and displaying in response to each additional new digit entered by the user; and means within the control circuitry for transmitting the information, as edited, in response to a user command to transmit the information displayed on the display.

9. The radio telephone of claim 8, further comprising means within the control circuitry for displaying the new digit in response to a negative result from the means for testing.

10. The radio telephone of claim 8, wherein the number has a right end, and wherein the radio telephone further comprises means within the control circuitry for appending the new digit to the right end of the number in response to a negative result from the means for determining.

11. The radio telephone of claim 8, wherein, in response to both the first and second portions being present on the display, the means for displaying displays the first and second portions in a manner that distinguishes the first portion from the second portion.

12. A radio telephone comprising means for editing and transmitting information displayed on a display, the information representing a telephone number, the radio telephone comprising:

a receiver for correlating a selective call address associated with the radio telephone and, upon correlating the selective call address with the radio telephone, providing a received message;

control circuitry coupled to the receiver for controlling the radio telephone;

a memory coupled to the control circuitry for recording a stored number;

the display coupled to the control circuitry for displaying the stored number and other information;

controls coupled to the control circuitry for providing user control of the radio telephone and for entry, by a user, of a first command to clear a displayed digit;

a transmitter coupled to the control circuitry for transmitting messages from the radio telephone;

means within the control circuitry for testing, in response, whether there is a number on the display, wherein the number comprises a rightmost digit;

means within the control circuitry for determining, in response to a positive result from the means for testing, whether at least a first portion of the number is the stored number retrieved from the memory, wherein the first portion comprises a first digit;

means within the control circuitry for evaluating, in response to a positive result from the means for determining, whether there exists a second portion of the number, the second portion comprising at least one newly added digit placed immediately in front of the first portion, wherein the second portion comprises a last digit;

means within the control circuitry for clearing the first digit of the first portion in response to a negative result from the means for evaluating;

means within the control circuitry for clearing the last digit of the second portion in response to a positive result from the means for evaluating;

means within the control circuitry for displaying the information, as edited, on the display;

means within the control circuitry for repeating the testing, determining, evaluating, clearing, and displaying in response to each additional first command entered by the user to clear an additional displayed digit; and means within the control circuitry for transmitting the information, as edited, in response to a second user command to transmit the information displayed on the display.

13. The radio telephone of claim 12, further comprising means within the control circuitry for clearing the rightmost digit of the number in response to a negative result from the means for determining.

14. The radio telephone of claim 12, wherein, in response to both the first and second portions being present on the display, the means for displaying displays the first and second portions in a manner that distinguishes the first portion from the second portion.

* * * * *